(12) United States Patent
Chen et al.

(10) Patent No.: US 8,071,677 B2
(45) Date of Patent: Dec. 6, 2011

(54) PROCESS FOR PREPARING POLYESTER COMPOSITE MATERIALS

(75) Inventors: Jiazhong Chen, Boothwyn, PA (US); Tao He, Wilmington, DE (US); Libby Xiaowei Hu, Exton, PA (US); Yongqing Huang, Wilmington, DE (US); Suniti Moudgil, Wilmington, DE (US)

(73) Assignee: E. I. du Pont de Nemours and Company

( * ) Notice: Subject to any disclaimer, the term of this patent is extended or adjusted under 35 U.S.C. 154(b) by 413 days.

(21) Appl. No.: 12/333,377

(22) Filed: Dec. 12, 2008

(65) Prior Publication Data
US 2010/0152377 A1 Jun. 17, 2010

(51) Int. Cl.
*C08G 63/78* (2006.01)
*C08G 63/02* (2006.01)

(52) U.S. Cl. ........ 524/605; 524/261; 524/262; 524/588; 524/604; 524/847

(58) Field of Classification Search .................. 524/605, 524/261, 262, 588, 604, 847
See application file for complete search history.

(56) References Cited

U.S. PATENT DOCUMENTS

| | | | |
|---|---|---|---|
| 3,749,697 A | 7/1973 | Barkey | |
| 5,039,783 A | 8/1991 | Brunelle et al. | |
| 5,231,161 A | 7/1993 | Brunelle et al. | |
| 5,407,984 A | 4/1995 | Brunelle et al. | |
| 5,455,080 A * | 10/1995 | van Ooij | 427/470 |
| 5,668,186 A | 9/1997 | Brunelle et al. | |
| 6,646,134 B2 | 11/2003 | Brugel | |
| 6,979,720 B2 | 12/2005 | Brugel et al. | |
| 2006/0128935 A1 | 6/2006 | Tam et al. | |
| 2006/0205856 A1 | 9/2006 | Williamson | |
| 2007/0003749 A1 * | 1/2007 | Asgari | 428/304.4 |

FOREIGN PATENT DOCUMENTS

| | | |
|---|---|---|
| EP | 0221225 A1 | 5/1987 |
| JP | 198362626 A | 4/1983 |
| JP | 1994089236 B2 | 11/1994 |
| JP | 2001105902 A | 4/2001 |
| RO | 102006 B1 | 11/1991 |
| WO | 02068496 A1 | 9/2002 |
| WO | 0393491 A1 | 11/2003 |

OTHER PUBLICATIONS

Lavalette, Arnaud et al., Lipase-Catalyzed Synthesis of a Pure Macrocyclic Polyester from Dimethyl Terephthalate and Diethylene Glycol, BioMacromolecules, Mar./Apr. 2002, pp. 225-228, vol. 3, No. 2, American Chemical Society.
Bikiaris, Dimitris N. et al., Effect of carboxylic end groups and thermooxidative stability of PET and PBT, Polymer Degradation and Stability, 1999, pp. 213-218, vol. 63, Elsevier Science Ltd.
R. Storbeck et al., Synthesis and Thermal Analysis of Copolyesters Deriving from 1,4:3,6-Dianhydrosorbitol, Ethylene Glycol, and Terephthalic Acid, Journal of Applied Polymer Science, 1996, pp. 1199-1202, vol. 59.
Saccani, Andrea et al., Effects of Thermal Aging on Chemical-Physical and Electrical Properties of Poly (propylene terephthalate), Journal of Applied Polymer Science, 2004, pp. 2848-2854, vol. 91.
East, Anthony J., Polyesters, Thermoplastic, Encyclopedia of Polymer Science and Technology, 3rd ed., 2003, J. I. Kroschwitz exec. ed., pp. 504-529, vol. 7.

* cited by examiner

*Primary Examiner* — Kelechi Egwim

(57) ABSTRACT

A process is provided for preparing polyester composite materials, comprising polymerizing at least one polyester precursor in the presence of filler microparticles and/or nanoparticles and organosilane having nucleophilic functionality. The organosilane is added as a distinct ingredient. The polyester composites so prepared have low acid end group content, thus improved hydrolytic and melt stability and improved elongation at break.

13 Claims, No Drawings

PROCESS FOR PREPARING POLYESTER COMPOSITE MATERIALS

FIELD OF DISCLOSURE

The disclosure relates to the preparation of polyester microcomposites and nanocomposites having a low concentration of carboxylic acid end groups.

BACKGROUND

Nanocomposites are polymers reinforced with nanometer sized particles, i.e., particles with a dimension on the order of 1 to several hundred nanometers. Polymer-layered silicate nanocomposites normally incorporate a layered clay mineral filler in a polymer matrix. Layered silicates are made up of several hundred thin platelet layers stacked into an orderly packet known as a tactoid. Each of these platelets is characterized by large aspect ratio (diameter/thickness on the order of 100-1000). Accordingly, when the clay is dispersed homogeneously and exfoliated as individual platelets throughout the polymer matrix, dramatic increases in strength, flexural and Young's modulus, and heat distortion temperature are observed at very low filler loadings (<10% by weight) because of the large surface area contact between polymer and filler. These materials can be used, for example, in structural, semi-structural, high heat underhood, and Class A automotive components, among others To improve the interaction between hydrophilic fillers and a hydrophobic polymer matrix, the surface of the particle may be pretreated with an agent intended to make the surface more organophilic, for example, a quaternary alkylammonium salt for clays and organosilanes for glass fibers or other glass fillers U.S. Patent Publication 2006/0205856 teaches an in situ polymerization approach for the preparation of polyester nanocomposite compositions, namely, a process for manufacturing a thermoplastic polyester nanocomposite comprising mixing a sepiolite-type clay with at least one thermoplastic polyester precursor selected from the group consisting of at least one diacid or diester and at least one diol; at least one polymerizable polyester monomer; at least one linear polyester oligomer; and at least one macrocyclic polyester oligomer; and subsequently polymerizing said at least one polyester precursor in the presence or absence of a solvent.

Polyester nanocomposites produced by means of in situ polymerization comprise polyester having a high concentration of carboxylic acid end groups. In general, high acid end group content is undesirable in polyesters because of deleterious effects on properties such as hydrolytic and melt stability. High acid end group content also leads to corrosion problems when the polyester is in contact with metal and an outgassing problem at elevated temperature, which is particularly important in certain automotive applications. Furthermore, the acid end groups can catalyze the hydrolysis of the ester bonds of polyesters in an auto-catalytic process, leading to lower molecular weight and embrittlement. In general, the acid end content of polyesters is controlled by choosing proper catalysts, adjusting the amount of the catalysts, using specially designed reactors, and changing process conditions.

Among polyesters, high acid end group content is particularly deleterious in poly(butylene terephthalate) ("PBT"). For many applications of PBT in particular, such as automobile lighting, low acid end content, and good elongation at break. Therefore, it is highly desired to have a simple method to lower the acid end content of PBT-filler composites using the same processing equipment and conditions as thermoplastic polyesters without significantly decreasing elongation at break For the reasons set forth above, there exists a need for a simple process for producing filled polyesters, especially polyester nanocomposites, having low acid end group content.

SUMMARY

The invention is directed to a process for preparing polyester composite materials, comprising polymerizing at least one polyester precursor in the presence of:
a) a filler selected from microparticles, nanoparticles, or mixtures thereof, wherein the filler is selected from the group consisting of silica, silicates, and aluminosilicates, with the proviso that the filler is not pretreated with an organosilane; and
b) at least one organosilane having nucleophilic functionality.

DESCRIPTION

The following description is exemplary and explanatory only and is not restrictive of the invention, as defined in the appended claims.

A process is provided for preparing polyester composite materials, comprising polymerizing at least one polyester precursor in the presence of microparticles, nanoparticles, or a mixture of microparticles and nanoparticles, of at least one filler selected from the group consisting of silica, silicates, and aluminosilicates, with the proviso that the filler is not pretreated with an organosilane; and at least one organosilane having nucleophilic functionality.

In the context of this disclosure, a number of terms shall be utilized.

As used herein, the term "composite material" means a polymeric material which contains a particulate filler, dispersed throughout the polymeric material. The term "polyester composite" refers to a composite in which the polymeric material includes at least one polyester. The polymeric material in which the particles are dispersed is often referred to as the "polymer matrix."

As used herein, the term "nanocomposite" or "polymer nanocomposite" or "nanocomposite composition" means a polymeric material which contains particles, dispersed throughout the polymeric material, having at least one dimension in the 0.1 to 100 nm range ("nanoparticles").

As used herein, the term "microcomposite" or "polymer microcomposite" or "microcomposite composition" means a polymeric material which contains particles, dispersed throughout the polymeric material, having at least one dimension less than about 10 micrometers and greater than about 100 nm, i.e., 0.1 micrometer ("microparticles").

As used herein, the term "silica" means the compound $SiO_2$, which occurs in forms such as, but not limited to, quartz, sand, and glass.

As used herein, the term "silicate" means a mineral based on $[SiO_4]^{4-}$ tetrahedral, one or more metals, and sometimes hydrogen.

As used herein, the term "aluminosilicate" means a mineral composed of aluminum, silicon, oxygen; sometimes one or more metals; and sometimes hydrogen.

As used herein the term "modified" denotes particles that have treated with organic compounds to make them more organophilic; the term "unmodified" denotes particles that have not been so treated.

As used herein, the term "polyester" means a polymer in which more than 50% of the linking groups are ester groups. Other linking groups, such as amide or/and imide may also be present.

As used herein, the term "polyester precursor" means material which can be polymerized to a polyester, such as diacid (or diester)/diol mixtures, polymerizable polyester monomers, and polyester oligomers.

As used herein, the term "organosilane" means an organic derivative of a silane containing at least one carbon to silicon bond. As used herein the term "silane" means any of a group of silicon hydrides that are analogous to the paraffin hydrocarbons; especially the parent compound $SiH_4$.

As used herein the term "having nucleophilic functionality" denotes the presence of at least one functional group that is capable of donating a pair of electrons to a receiving group to form a covalent bond.

As used herein, the term "hydrocarbyl" means a univalent radical containing only carbon and hydrogen.

As used herein, the term "alkyl" denotes a univalent group derived from an alkane by removing a hydrogen atom from any carbon atom:
—$C_nH_{2n+1}$ where n≧1.

As used herein, the term "aryl" denotes a univalent group whose free valence is to a carbon atom of an aromatic ring.

As used herein, the term "aralkyl" denotes an alkyl group which bears an aryl group. One such example is the benzyl group, i.e., the radical,

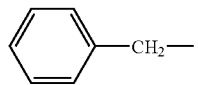

As used herein, the term "alkaryl" denotes an aryl group which bears an alkyl group. One such example is the 4-methyl phenyl radical,

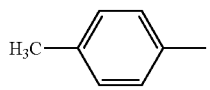

The terms "acid end," "acid end group," and "carboxylic acid end group" and "carboxylic end group" are used herein interchangeably.

Organosilanes

In the process disclosed herein, a polyester composite material is prepared by a process comprising polymerizing at least one polyester precursor in the presence of a filler component, with the proviso that the filler is not pretreated with an organosilane, and at least one organosilane having nucleophilic functionality.

Organosilanes suitable for use in the process may be represented generally by Formula (I)

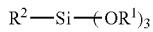

wherein each $R^1$ is an independently selected hydrocarbyl group and
$R^2$ is an aryl, alkyl, aralkyl, or alkaryl group wherein $R^2$ comprises at least one nucleophilic functional group.

Suitable nucleophilic substituents include without limitation primary, secondary, and tertiary amino groups; hydroxyl groups (OH); and mercapto groups (SH).

Preferably, the organosilane is a primary, secondary, or tertiary aminosilane.

Examples of organosilanes that can be used in the process described herein include without limitation:

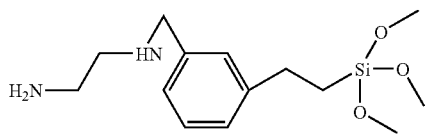

(Aminoethylaminomethyl)phenethyltrimethoxysilane

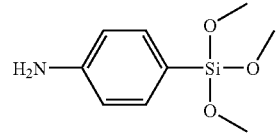

p-Aminophenyl trimethoxysilane

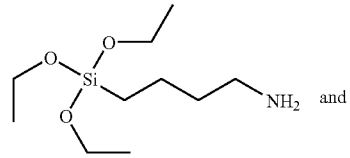

and 4-aminobutyltriethoxysilane

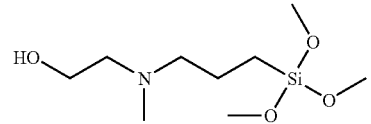

N-(Hydroxyethyl)-N-Methylamino-propyltrimethoxysilane.

The amount of organosilane used in the process described herein is between about 1 wt % and about 20 wt % based on the weight of the filler component.

Particulate Fillers

Particulate fillers suitable for use in the process described herein include particulate inorganic fillers selected from silica, silicates, and aluminosilicates. Examples include, but are not limited to, silica itself; mica, wollastonite; kaolinite, dickite, halloysite, nakrite, serpentine, greenalithe, berthrierine, cronstedtite, amesite, pyrophyllite, muscovite, illite, glauconite, talc, biotite, vermiculite, smectite, montmorillonite, hectorite, saponite, beidellite, sauconite, nontronite, zeolites, kenyaite, sepiolite, attapulgite, and mixtures thereof. Sepiolite is preferred.

In one embodiment, the filler particles used in the process described herein are microparticles; that is, the particles have at least one dimension less than about 10 micrometers and greater than about 0.1 micrometer (100 nm). In another embodiment, the particles are nanoparticles, having at least one dimension in the about 0.1 to about 100 nm range. Such filler particles may be treated with organic compounds that make them more "organophilic," i.e., more compatible with systems of low-to-medium polarity (e.g., PANGEL® B20 sepiolite clay available from the Tolsa Group). An example of such organic material for sepiolite-type clay is a quaternary ammonium salt such as dimethylbenxylalkylammonium chloride, as disclosed in European Patent Application 221, 225. Particles that are not treated with such organic compounds are referred to as "unmodified." The advantages of the process described herein are especially seen when an unmodified filler is used. Unmodified fillers are commercially available. For example, sepiolite is available in a high purity ("rheological grade"), unmodified form, e.g., PANGEL® S9 sepiolite clay available from the Tolsa Group, Madrid, Spain.

The amount of particulate filler used in the process described herein ranges from about 1.5 to about 10 wt % based on the weight of the total composition. The upper limit will vary somewhat depending on specific type of particle (chemistry, polymerization conditions depending on what polyester is being made, etc.). The specific amount chosen will depend on the intended use of the composite composition, as is well understood in the art. For example, in film, it may be advantageous to use as little particulate filler as possible, so as to retain desired optical properties. Compositions containing relatively high concentrations of exfoliated clay may also be used as masterbatches. For example a composite composition masterbatch containing 10% by weight of the particulate filler may be used. If a composition having 2 weight percent of the filler is needed, the composition containing the 2 weight percent may be made by melt mixing 1 part by weight of the 10% masterbatch with 4 parts by weight of the "pure" polyester. During this melt mixing other desired components can also be added to form the final desired composition.

Polyesters

The polyester is selected from the group consisting of: at least one polyester homopolymer; at least one polyester copolymer; a polymeric blend comprising at least one polyester homopolymer or copolymer; and mixtures of these.

Polyesters which have mostly or all ester linking groups are normally derived from one or more dicarboxylic acids and one or more diols. They can also be produced from polymerizable polyester monomers or from macrocyclic polyester oligomers.

Polyesters most suitable for use in practicing the invention comprise isotropic thermoplastic polyester homopolymers and copolymers (both block and random). Examples include without limitation: poly(ethylene terephthalate), poly(1,3-propylene terephthalate), poly(1,4-butylene terephthalate), a thermoplastic elastomeric polyester having poly(1,4-butylene terephthalate) and poly(tetramethylene ether)glycol blocks, poly(1,4-cylohexyldimethylene terephthalate), and polylactic acid.

The dicarboxylic acid component is selected from unsubstituted and substituted aromatic, aliphatic, unsaturated, and alicyclic dicarboxylic acids and the lower alkyl esters of dicarboxylic acids preferably having from 2 carbons to 36 carbons. Specific examples of suitable dicarboxylic acid components include without limitation terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), oxalic acid, dimethyl oxalate, malonic acid, dimethyl malonate, succinic acid, dimethyl succinate, methylsuccinic acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,4-cyclohexanedicarboxylate, 1,3-cyclohexanedicarboxylic acid, dimethyl-1,3-cyclohexanedicarboxylate, 1,1-cyclohexanediacetic acid, metal salts of 5-sulfodimethylisophalate, fumaric acid, maleic anhydride, maleic acid, hexahydrophthalic acid phthalic acid and the like and mixtures derived there from. Other dicarboxylic acids suitable for use in forming the monofilaments will be apparent to those skilled in the art. Preferred dicarboxylic acids include terephthalic acid, dimethyl terephthalate, isophthalic acid, and dimethyl isophthalate.

The diol component is selected from unsubstituted, substituted, straight chain, branched, cyclic aliphatic, aliphatic-aromatic or aromatic diols having from 2 carbon atoms to 36 carbon atoms and poly(alkylene ether) glycols with molecular weights between about 250 to 4,000. Specific examples of the desirable diol component include ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol (both cis and trans structures), di(ethylene glycol), tri(ethylene glycol), poly(ethylene ether) glycols with molecular weights between 250 and 4000, poly(1,2-propylene ether) glycols with molecular weights between 250 and 4000, block poly(ethylene-co-propylene-co-ethylene ether) glycols with molecular weights between 250 and 4000, poly(1,3-propylene ether) glycols with molecular weights between 250 and 4000, poly(butylene ether) glycols with molecular weights between 250 and 4000 and the like and mixtures derived there from.

A polyfunctional branching agent may be present as well, i.e., any material with three or more carboxylic acid functional groups, hydroxyl functional groups or a mixture thereof. Essentially any polyfunctional material that includes three or more carboxylic acid or hydroxyl functions can be used, and such materials will be apparent to those skilled in the art. Examples of polyfunctional branching agent components include without limitation: 1,2,4-benzenetricarboxylic acid, (trimellitic acid), trimethyl-1,2,4-benzenetricarboxylate, tris(2-hyroxyethyl)-1,2,4-benzenetricarboxylate, trimethyl-1,2,4-benzenetricarboxylate, 1,2,4-benzenetricarboxylic anhydride, (trimellitic anhydride), and mixtures thereof.

The polyesters can be prepared by conventional polycondensation techniques. The product compositions can vary somewhat based on the method of preparation used, particularly with respect to the amount of diol that is present within the polymer. Although not preferred, the polyesters can be prepared using techniques that utilize acid chlorides. Such procedures are disclosed, for example, in R. Storbeck, et al.,

*J. Appl. Polymer Science*, Vol. 59, pp. 1199-1202 (1996), the disclosure of which is hereby incorporated herein by reference.

Preferably, the polyesters are produced by melt polymerization. In melt polymerization, the dicarboxylic acid component, (as acids, esters, or mixtures thereof), the diol component and the polyfunctional branching agent are combined in the presence of a catalyst to a high enough temperature that the monomers combine to form esters and diesters, then oligomers, and finally polymers. The polymeric product at the end of the polymerization process is a molten product. Generally, the diol component is volatile and distills from the reactor as the polymerization proceeds. Such procedures are well known in the art and are described in, for example, in "Polyesters, Thermoplastic" by Anthony J. East in the Encyclopedia of Polymer Science and Technology, 3rd ed. (2003), J. I. Kroschwitz exec. ed., vol. 7, pp. 504-529 and references cited therein.

The melt process conditions, particularly the amounts of monomers used, depend on the polymer composition desired. The amount of the diol component, dicarboxylic acid component, and branching agent are desirably chosen so that the final polymeric product contains the desired amounts of the various monomer units, desirably with equimolar amounts of monomer units derived from the respective diol and diacid components. Because of the volatility of some of the monomers, especially some of the diol components, and depending on such variables as whether the reactor is sealed, (i.e., is under pressure), the polymerization temperature ramp rate, and the efficiency of the distillation columns used in synthesizing the polymer, some of the monomers can be used in excess at the beginning of the polymerization reaction and removed by distillation as the reaction proceeds. This is particularly true of the diol component.

The exact amounts of monomers to be charged to a particular reactor can be determined by a skilled practitioner, but often will be in the ranges below. Excesses of the diacid and diol are often desirably charged, and the excess diacid and diol is desirably removed by distillation or other means of evaporation as the polymerization reaction proceeds. The diol component is desirably charged at a level 0 to 100 percent greater than the desired incorporation level in the final product. For example, for diol components that are volatile under the polymerization conditions, such as ethylene glycol, 1,3-propanediol, or 1,4-butanediol, 30 to 100 percent excesses are desirably charged. For less volatile diol components, such as the poly(alkylene ether) glycols or dimer diol, excesses may not be required.

The amounts of monomers used can vary widely, because of the wide variation in the monomer loss during polymerization, depending on the efficiency of distillation columns and other kinds of recovery and recycle systems and the like, and are only an approximation. Exact amounts of monomers that are charged to a specific reactor to achieve a specific composition can be determined by a skilled practitioner.

In the melt polymerization process, the monomers are combined, and are heated gradually with mixing with a catalyst or catalyst mixture to a temperature in the range of 220° C. to about 300° C., preferably 240° C. to 295° C. The exact conditions and the catalysts depend on whether the diacids are polymerized as true acids or as dimethyl esters. The catalyst can be included initially with the reactants, and/or can be added one or more times to the mixture as it is heated. The catalyst used can be modified as the reaction proceeds. The heating and stirring are continued for a sufficient time and to a sufficient temperature, generally with removal by distillation of excess reactants, to yield a molten polymer having a high enough molecular weight to be suitable for the intended application.

Continuous polymerization process for manufacturing poly(butylene terephthalate) using dimethyl terephthalate ("DMT") and 1,4-butanediol are well documented in open literature. In general, a typical process begins with the transesterification of DMT with 1,4-butanediol at a mole ratio from 1.0 to about 2.5 with a preference near 1.3 to about 2.1. The mixture is heated typically from 180-230° C. in the presence of a transesterification catalyst such as manganese, zinc, or titanium. The second stage of the process involves polycondensation of the polymer under increasing heat and increasing vacuum. This second step may involve more than one vessel with agitation by any of various methods listed in common literature. Typical process temperatures will be from 220° C.-280° C., with 250° C.-260° C. preferable, but dependent on the polymer being produced. The vacuum is incrementally increased in the subsequent vessels to reach between 0.01 and 10 torr.

Catalysts that can be used include salts of Li, Ca, Mg, Mn, Zn, Pb, Sb, Sn, Ge, Zr and Ti, such as acetate salts and oxides, including glycol adducts, and Ti alkoxides. Suitable catalysts are generally known, and the specific catalyst or combination or sequence of catalysts used can be selected by a skilled practitioner. The preferred catalyst and preferred conditions differ depending on, for example, whether the diacid monomer is polymerized as the free diacid or as a dimethyl ester, and the exact chemical identity of the diol component.

Polyesters can also be produced directly from polymerizable polyester monomers. Some representative examples of suitable polymerizable polyester monomers for use in the present invention include hydroxyacids such as hydroxybenzoic acids, hydroxynaphthoic acids and lactic acid; bis(2-hydroxyethyl) terephthalate, bis(4-hydroxybutyl) terephthalate, bis(2-hydroxyethyl)naphthalenedioate, bis(2-hydroxyethyl)isophthalate, bis[2-(2-hydroxyethoxy)ethyl] terephthalate, bis[2-(2-hydroxyethoxy)ethyl]isophthalate, bis[(4-hydroxymethylcyclohexyl)methyl]terephthalate, and bis[(4-hydroxymethylcyclohexyl)methyl]isophthalate, mono(2-hydroxyethyl)terephthalate, bis(2-hydroxyethyl) sulfoisophthalate, and lactide.

Polyesters can also be produced directly from macrocyclic polyester oligomers. Macrocyclic polyester oligomers that may be employed in this invention include, but are not limited to, macrocyclic poly(alkylene dicarboxylate) oligomers having a structural repeat unit of the formula:

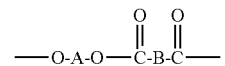

wherein A is an alkylene group containing at least two carbon atoms, a cycloalkylene, or a mono- or polyoxyalkylene group; and B is a divalent aromatic or alicyclic group. They may be prepared in a variety of ways, such as those described in U.S. Pat. Nos. 5,039,783, 5,231,161, 5,407,984, 5,668,186, United States Patent Publication No. 2006/128935, PCT Patent Applications WO 2003093491 and WO 2002068496, and A. Lavalette, et al., Biomacromolecules, vol. 3, p. 225-228 (2002). Macrocyclic polyester oligomers can also be obtained through extraction from low-molecular weight linear polyester.

Preferred macrocyclic polyester oligomers are macrocyclic polyester oligomers of 1,4-butylene terephthalate (CBT); 1,3-propylene terephthalate (CPT); 1,4-cyclohexylenedimethylene terephthalate (CCT); ethylene terephthalate (CET); 1,2-ethylene 2,6-naphthalenedicarboxylate (CEN); the cyclic ester dimer of terephthalic acid and diethylene glycol (CPEOT); and macrocyclic co-oligoesters comprising two or more of the above structural repeat units.

Process Conditions

Process conditions for making the polyester composite are the same as those known in the art for manufacturing polyesters in a melt or solution process. The organosilane can be added by any means known in the art at any convenient stage of manufacture before the polyester degree of polymerization is about 20. For example, it can be added at the beginning with the monomers, during monomer esterification or ester-interchange, at the end of monomer esterification or ester-interchange, or early in the polycondensation step. The organosilane is added as a separate ingredient, not as a coating on a filler. Similarly, the filler can be added by any means known in the art at any convenient stage of manufacture before the polyester degree of polymerization is about 20.

Where the polyester is PET and production of diethylene glycol ("DEG") needs to be controlled during the reaction, a range of catalysts can be used. These include the use of lithium acetate buffers as described in U.S. Pat. No. 3,749,697 and a range of sodium and potassium acetate buffers as described in JP 83-62626, RO 88-135207, and JP 2001-105902. Typically, 100-600 ppm of sodium or potassium acetate is used during the polymerization to minimize the degree of DEG formation and incorporation into the polymer.

The polyester composite materials described herein can be processed easily by conventional thermoplastic processes, including without limitation injection molding, blow molding, calendaring, rotational molding, extrusion, melt casting, melt spinning, and film blowing.

Monofilament fiber comprising polyester composite material described herein can be produced by melt extrusion (for example, using a single screw or twin screw extruder) of the polyester composite itself or, if the polyester composite is being used as a masterbatch, a mixture of the polyester composite with enough additional polyester that the extruded fiber will contain the desired effective amount of particulate filler. Typical processes for producing fibers are well documented in the open literature. Any known process for producing monofilaments can be used to form monofilaments from the polyester nanocomposites.

Uses

The polyester composite materials produced by the process described herein can be used in articles of manufacture in a wide variety of applications, including without limitation articles for: electrical and electronic applications, such as electrical connectors, plugs, switches, keyboard components, printed circuit boards, and small electric motor components; automotive applications, such as distributor caps, coil-formers, rotors, windshield wiper arms, headlight mountings, and other fittings; industrial machinery, for example in molded conveyor-belt links; medical devices, such as nasal sprays and nebulizers; home appliances, such as food mixers, hair dryers, coffee makers, and toasters; and a variety of other applications, such as fiber-optical cable buffer tubes, countertops, and camera parts. In such applications, the polyester composite material may be blended with flame retardants or other polymers, for example, polycarbonate and various rubber tougheners.

Polyester composites described herein wherein the polyester is a thermoplastic poly(ether-ester) elastomer are especially useful in articles requiring excellent flex fatigue and broad use temperature. Examples include without limitation seals, belts, bushings, pump diaphragms, gears, protective boots, hose and tubing, springs, and impact-absorbing devices. Some of the industries where such parts can be used include the automotive, fluid power, electrical/electronic, appliance and power tool, sporting goods, footwear, wire and cable (including fiber optics), furniture, and off-road transportation equipment.

Polyester monofilaments are used as reinforcements for rubber articles, fishing lines, toothbrush bristles, paintbrush bristles and the like, and in industrial applications such as tire cords, composites, belts, and textiles. In addition, woven fabrics produced from monofilaments are used, for example, in industrial belts and paper machine clothing. Multifilament yarns can be produced comprising the polyester composites described herein using any of the typical processes well known in the art for making multifilament polyester yarns. Monofilaments and multifilament yarns can be woven into textile fabrics, using known processes.

EXAMPLES

The present invention is further defined in the following examples. It should be understood that these examples, while indicating embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

The meaning of abbreviations is as follows: "BDO" means 1,4-butanediol, "cm" means centimeter(s), "DMT" means dimethyl terephthalate, "g" means gram(s), "h" means hour(s), "kg" means kilogram(s), "lb" means pound(s), "meq" means milliequivalent(s), "mg" means milligram(s), "min" means minute(s), "mL" means milliliter(s), "µL" means microliter(s), "mmol" means millimole(s), "$M_n$" means number average molecular weight, "mtorr" means millitorr), "$M_w$" means weight average molecular weight, "ppm" means parts per million, "Td" means decomposition temperature, "TBT" means tetrabutyltitanate, "PBT" means poly(butylene terephthalate), "wt %" means weight percent(age), and "SEC" means size exclusion chromatography.

Polymer and Composite Characterization.

A size exclusion chromatography (SEC) system comprised of a Model Alliance® 2690 from Waters Corporation (Milford, Mass. USA), with a Waters® 410 refractive index detector (DRI) and Viscotek Corp. (Houston, Tex., USA) Model T6OATM dual detector module incorporating static right angle light scattering and differential capillary viscometer detectors was used for molecular weight characterization. The mobile phase was 1,1,1,3,3,3-hexafluoro-2-propanol (HFIP) with 0.01 M sodium trifluoroacetate. The dn/dc was measured for the polymers and it was assumed that the entire sample was completely eluted during the measurement.

Elongation at break was measured using ASTM Method D256 at an extension rate of 5.08 cm (2 inches) per minute.

The carboxylic end group concentration was determined by means of photometric titration of a solution of samples in a mixture of o-cresol and o-dichlorobenzene (25:30 parts by weight ratio) with 0.05 N methanolic potassium hydroxide solution using bromothymol blue as indicator.

In the Examples, all parts are parts by weight.

Materials

Dimethyl terephthalate ("DMT") was obtained from INVISTA (Wichita, Kans., USA). 1,4-Butanediol ("BDO") was obtained from Univar USA (Kirkland, Wash., USA). Tyzor® tetrabutyltitanate ("TBT") and Crastin® 6131 an unreinforced, low viscosity PBT engineering polymer were both obtained from E.I. DuPont de Nemours & Co., Inc (Wilmington, Del., USA).

Pangel® B20 sepiolite and Pangel® S9 sepiolite were purchased from EM Sullivan Associates, Inc. (Paoli, Pa., USA), a distributor for the manufacturer, Tolsa S.A. (Madrid 28001, Spain). TEM of the as-received S9 sepiolite revealed the presence of both nanofibers and fibrous aggregates with a largest dimension about 5-10 micrometers across. It is reported that the "B" grades of Pangel® sepiolite have surfaces which have been "organically modified" i.e., treated with an organic material to make the clay more compatible with systems of low-to-medium polarity. An example of such a coating for sepiolite-type clay is a quaternary ammonium salt such as dimethylbenxylalkylammonium chloride, as disclosed in European Patent Application 221,225. Thermogravimetric analysis of the Pangel® B20 sepiolite indicated the coating agent was present at over 10 wt %. Pangel® S9 has an unmodified surface.

S-BEN montmorillonite was obtained from product of Hojun Co., Ltd (Japan). The surfaces of the montmorillonite were modified using dimethyl stearyl benzyl ammonium at a level of 29.9 wt % according to the manufacturer.

Colloidal Activated Attapulgite (CAS#: 12174-11-7), product number A1290, Lot No. UU0018, was obtained from Spectrum Chemical Mfg. Corp. (Gardena, Calif., USA); SEM of the as-received attapulgite indicates it was largely made up of large aggregates (typically having the largest dimension around 10 micrometers across) of fibers.

The following organosilane agents were purchased from Gelest, Inc. (Morrisville, Pa., USA):

Organosilane-A (CAS No.: 75822-22-9):
(Aminoethylaminomethyl)phenethyltrimethoxysilane (90% mixed meta, para isomers, MW: 298.46), Td=435° C. (25% weight loss)

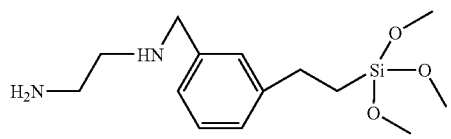

Organosilane-B (CAS No.: 33976-43-1): p-Aminophenyl trimethoxysilane (90%, MW: 213.31), Td=485° C. (25% weight loss). Appearance: brown crystal.

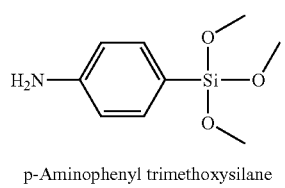

p-Aminophenyl trimethoxysilane

Organosilane-C (CAS No.: 3069-30-5) 4-aminobutyltriethoxysilane (MW 235.4).

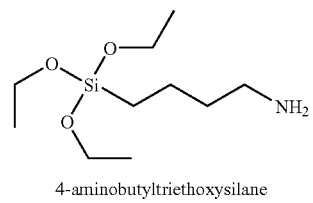

4-aminobutyltriethoxysilane

Organosilane-D (SIH6172.0) N-(Hydroxyethyl)-N-Methylamino-propyltrimethoxysilane (75% in methanol) MW 237.4.

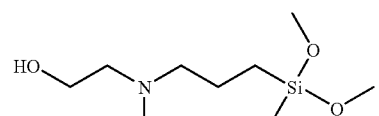

N-(Hydroxyethyl)-N-Methylamino-propyltrimethoxysilane

Organosilane-E (CAS No.: 17873-01-7) P-tolyltrimethoxysilane, MW 212.32.

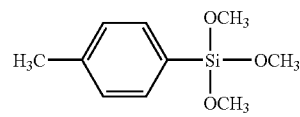

Polymerization Protocol.

Polymerizations were carried out using the following method: the amounts given are for lab-scale polymerizations. BDO (68.09 g, 756 mmol) or a mixture of BDO and the indicated amounts of filler and/or organosilane was heated to 160° C. under a light nitrogen flush. DMT (88.23 g, 454 mmol) and Tyzor® TBT (80 µL, 0.198 mmol) were then added to the reaction vessel. The reaction temperature was increased to 225° C., held at 225° C. for 40 min, then increased to 250° C. at a rate of 1° C./min. Once the reaction temperature had reached 250° C., it was held constant for 30 min. The nitrogen flush was then closed off and vacuum was slowly introduced. After 15 min, the vacuum was increased to a full vacuum, eventually reaching a pressure below 100 mTorr. The polymerization was stopped either when an appreciable amount of torque was reached, or if this did not occur, after about two hours under full vacuum.

Example 1

This Example demonstrates the effectiveness of the process described herein in producing a PBT nanocomposite with low acid ends content.

BDO (68.09 g, 756 mmol), sepiolite (Pangel® S9, 3.0 g, pre-dried for 4 h in a 100° C. oven) and 90 mg organosilane A were charged to a 1000 mL three necked round-bottomed flask to form a reaction mixture. DMT (88.23 g, 454 mmol) and Tyzor® TBT (80 µL, 0.198 mmol) were then added to the flask. An overhead stirrer was attached and a distillation condenser was attached. Polymerization was carried out as described above. $M_n$, $M_w$, and acid end content of the polymerization product were measured and are presented in Table 1.

Comparative Example A

In this Comparative Example, a PBT polymerization was carried out with neither organosilane nor sepiolite present.

BDO (68.09 g, 756 mmol) was charged to a 1000 mL three necked round-bottomed flask. DMT (88.23 g, 454 mmol) and Tyzor® TBT (80 μL, 0.198 mmol) were then added to the flask. An overhead stirrer was attached and a distillation condenser was attached. Polymerization was carried out as described above. $M_n$, $M_w$, and acid end content of the polymerization product were measured and are presented in Table 1. This Comparative Example illustrates the properties of the PBT control.

Comparative Example B

In this Comparative Example, a PBT polymerization was carried out with sepiolite present but without organosilane.

BDO (68.09 g, 756 mmol), sepiolite (Pangel® S9, 3.0 g, pre-dried for 4 h in a 100° C. oven) were charged to a 1000 mL three necked round-bottomed flask. DMT (88.23 g, 454 mmol) and Tyzor®TBT (80 μL, 0.198 mmol) were then added to the reaction vessel. An overhead stirrer was attached and a distillation condenser was attached. Polymerization was carried out as described above. $M_n$, $M_w$ and acid end content of the polymerization product were measured and are presented in Table 1. This Comparative Example demonstrates the increase in acid end groups and decrease in molecular weight seen when unmodified sepiolite is present during the polymerization of PBT.

Comparative Example C

In this Comparative Example, a PBT polymerization was carried out with organically modified sepiolite present but without organosilane.

BDO (68.09 g, 756 mmol), Pangel® B20 (3.0 g, pre-dried for 4 h in a 100° C. oven) were charged to a 1000 mL three necked round-bottomed flask. DMT (88.23 g, 454 mmol) and Tyzor® TBT (80 μL, 0.198 mmol) were then added to the reaction vessel. An overhead stirrer was attached and a distillation condenser was attached. Polymerization was carried out as described above. $M_n$, $M_w$, and acid end content of the polymerization product were measured and are presented in Table 1. This Comparative Example demonstrates that the acid end groups increase to a smaller degree when an organically modified sepiolite (>10 wt % organic content based on B20) is present during the polymerization of PBT. The organic modifier, a quaternary alkylammonium compound, is less effective at greater than 10 wt % than organosilane A at 3 wt % based on sepiolite.

TABLE 1

| Example | Sepiolite* (wt %, based on final resin composition) | Organolsilane (wt %, based on sepiolite) | $M_n$ | $M_w$ | Acid Ends (meq/kg) |
|---|---|---|---|---|---|
| Example 1 | 3 | 3 | 37,690 | 75,880 | 5.0 |
| Comparative A | 0 | 0 | 35,800 | 75,540 | 16.4 |
| Comparative B | 3 | 0 | 15,940 | 34,900 | 63.7 |
| Comparative C* | 3* | 0* | 36,020 | 78,990 | 13.3 |

*This sepiolite contains >10 wt % quaternary alkylammonium organic modifier.

Examples 2-4

These Examples demonstrate the effect of different amounts of organosilane A on the acid group content of PBT polymerized in the presence of unmodified sepiolite.

The procedure of Example 1 was repeated using Pangel® S9 sepiolite (3.0 g, pre-dried for 4 h in a 100° C. oven) and three different amounts of organosilane A: 1, 3, and 10 wt %, based on the weight of the sepiolite. As shown in Table 2, a greater decrease in acid ends content was observed as the organosilane content increased.

TABLE 2

| Example | S9 sepiolite* (wt %, based on final composition) | Organosilane A (wt %, based on sepiolite) | Acid Ends (meq/kg) |
|---|---|---|---|
| Example 2 | 3 | 1 | 31.1 |
| Example 3 | 3 | 3 | 16.1 |
| Example 4 | 3 | 10 | 8.4 |

*These examples used a different lot of S9 sepiolite than Example 1.

Examples 5-7

Comparative Example D

Examples 3, 5-7 and Comparative Example D demonstrate the effect of different organosilanes on the acid group content of PBT polymerized in the presence of unmodified sepiolite.

The procedure of Example 1 was repeated using Pangel® S9 sepiolite (3.0 g, pre-dried for 4 h in a 100° C. oven) and 3 wt % (based on the weight of the sepiolite) of organosilanes B, C, D, and E. Acid end group contents for these samples and for Example 3 are shown in Table 3. Organosilanes A, B, C, and D each comprise at least one nucleophilic functional group, while organosilane E (Comparative Example D) does not. Organosilane E is the least effective of these at producing a material with decreased acid end group content.

TABLE 3

| Example | Organosilane (3 wt % based on sepiolite) | Acid Ends (meq/kg) |
|---|---|---|
| Example 3 | A - | 16.1 |
| Example 5 | B | 13.5 |
| Example 6 | C | 7.5 |
| Example 7 | D | 10.8 |
| Comparative Ex. D | E | 40.9 |

Example 8

Comparative Example E

Example 8 and Comparative Example E demonstrate that, using the process described herein, the use of organosilane A can also reduces acid end group content in PBT polymerized in the presence of attapulgite.

The procedure of Example 1 was repeated using Colloidal Activated Attapulgite (CAS#: 12174-11-7) (3.0 g, pre-dried for 4 h in a 100° C. oven) and 3 wt % (based on the weight of the attapulgite) of organosilanes A. In Comparative Example E, no organosilane was added. Acid end group contents for these samples are shown in Table 4.

TABLE 4

| Example | Organosilane A (wt % based on attapulgite) | Acid Ends (meq/kg) |
|---|---|---|
| Example 8 | 3 | 25.3 |
| Comparative Ex. E | 0 | 38.6 |

To evaluate the impact of the process described herein on the mechanical properties of the polyester composites thereby produced, the polymerization reaction was scaled up to 10 lb (4.536 kg). Table 5 shows that adding organosilane A could not only decrease the acid end content but also significantly improve the elongation at break of molded specimens.

Comparative Example F

A commercial PBT product (Crastin® 6131) was used as a control for the PBT that was polymerized on a 10 lb (4.536 kg) scale, namely, Comparative Example G.

Comparative Example G

This Comparative Example illustrates the polymerization protocol used for the 10 lb (4.536 kg) polymerizations in Examples 9-12 and Comparative Examples H-K.

A stainless steel autoclave was charged with DMT (8.0 lb (3.629 kg)), BDO (7.42 lb (3.366 kg)), and Tyzor® TBT (2.8 g, 88 ppm Ti). The reactor contents were purged with 60 psi of nitrogen three times and then heated to 210° C. at 1.5° C./mm with agitation at 25 RPM. The reaction temperature was maintained at 210° C. to allow most of methanol to come out. The reaction mixture was then heated to 250° C. at 1.5° C./mm; vacuum was then applied for a 90 minute vacuum reduction cycle. Upon completion of the vacuum reduction cycle, a full vacuum (0.1 torr) was applied and the reaction mixture was maintained at 250° C. for 120 min. The reactor was then pressurized with nitrogen, and the polymer was collected and extruded into pellets. The polymer had a carboxylic acid end group content of 16.4 meq/kg. The polymer molecular weight was determined using SEC: $M_n$=16250, and $M_w$=42360. Elongation at break of molded specimens is presented in Table 5.

Comparative Example H

In an attempt to prepare a PBT/Pangel® S9 sepiolite nanocomposite with the standard amount of catalyst (88 ppm Ti) on a 10 lb (4.536 kg) scale, without organosilane, Comparative Example G was repeated but Pangel® S9 sepiolite (0.3 lb, 0.136 kg) was added to the reactor together with the DMT, BDO and TBT. No polymerization occurred.

Comparative Example I

This Comparative Example illustrates the preparation of a PBT/Pangel® S9 sepiolite nanocomposite with a high catalyst level, with sepiolite, and without organosilane.

Comparative Example H was repeated but using a higher catalyst concentration, 11.2 g (354 ppm Ti) of Tyzor® TBT. Polymerization occurred. The polymer in the resulting nanocomposite had a carboxylic acid end group content of 150.4 meq/kg, which is significantly higher than that of the PBT control in Comparative Example G The polymer molecular weight was determined using SEC: $M_n$=9945, and $M_w$=30260. Elongation at break of molded specimens of the nanocomposite is presented in Table 5.

Example 9

This Example illustrates the preparation of a PBT nanocomposite with unmodified sepiolite and an organosilane.

Comparative Example H was repeated except that 3.45 g (0.08 wt % of the total reactor charge, 2.5 wt % based on sepiolite) of organosilane A was added to the reactor with the DMT, BDO, TBT, and Pangel® S9 sepiolite. The polymer in the resulting nanocomposite had a carboxylic acid end group content of 43.4 meq/kg. The polymer molecular weight was determined by SEC: $M_n$=15880 and $M_w$=45090. Elongation at break of molded specimens is presented in Table 5.

Example 10

This Example illustrates the preparation of a PBT nanocomposite with unmodified sepiolite and a larger amount of the organosilane used in Example 9.

Example 9 was repeated except that 6.81 g (0.16 wt % of the total reactor charge, 5 wt % based on sepiolite) of organosilane A was added to the reactor with the DMT, BDO, TBT, and Pangel® S9 sepiolite. The polymer in the resulting nanocomposite had a carboxylic acid end group content of 14.5 meq/kg. The polymer molecular weight was determined by SEC: $M_n$=17650 and $M_w$=52690. Elongation at break of molded specimens is presented in Table 5.

Comparative Example J

This Comparative Example illustrates the preparation of a PBT nanocomposite with an organically modified sepiolite, without organosilane.

Comparative Example H was repeated, except that Pangel® B20 sepiolite was used in place of Pangel® S9 sepiolite. The polymer in the resulting nanocomposite had a carboxylic acid end group content of 16.7 meq/kg. The polymer molecular weight was determined using SEC: $M_n$=15210, $M_w$=43660. Elongation at break of molded specimens is presented in Table 5.

Example 11

This Example illustrates the preparation of a PBT nanocomposite with an organically modified sepiolite, with organosilane.

Comparative Example J was repeated except that 7.06 g of organosilane A (5 wt % based on B20) was added to the reactor with the DMT, BDO, TBT, and Pangel® B20 sepiolite. The polymer in the resulting nanocomposite had a carboxylic acid end group content of 14.7 meq/kg. The polymer molecular weight was determined using SEC: $M_n$=16300 and $M_w$=49570. Elongation at break of molded specimens is presented in Table 5.

Comparative Example K

This Comparative Example illustrates the preparation of a PBT nanocomposite with an organically modified montmorillonite, without organosilane.

Comparative Example H was repeated except that montmorillonite S-BEN (0.26 lb) was used in place of the Pangel® S9 sepiolite. The polymer in the resulting nanocomposite had a carboxylic acid end group content of 62.7 meq/kg. The polymer molecular weight was determined using SEC:

$M_n$=14740 and $M_w$=44710. Elongation at break of molded specimens is presented in Table 5.

Example 12

This Example illustrates the preparation of a PBT nanocomposite with an organically modified montmorillonite, with organosilane.

Comparative Example K was repeated except that 6.81 g (0.16 wt % of the total reactor charge, 5 wt % based on S-BEN) of organosilane A was added to the reactor with the DMT, BDO, TBT and S-BEN montmorillonite. The polymer in the resulting nanocomposite had a carboxylic acid end group content of 31.9 meq/kg. The polymer molecular weight was determined using SEC: $M_n$=17320 and $M_w$=54510. Elongation at break of molded specimens is presented in Table 5.

TABLE 5

|  | Filler Type | Wt % Filler | Organosilane A (wt %) | Acid Ends (meq/kg) | Elongation at Break (%) |
| --- | --- | --- | --- | --- | --- |
| Comparative F | None | 0 | 0 | 16.5 | 16.2 ± 1.5 |
| Comparative G | None | 0 | 0 | 16.6 | 20.5 ± 4.7 |
| Comparative H | S9 | 3 | 0 | * | * |
| Comparative I** | S9 | 3 | 0 | 150.4 | 1.9 ± 0.1 |
| Example 9 | S9 | 3 | 2.5 | 43.4 | 9.9 ± 2.5 |
| Example 10 | S9 | 3 | 5 | 14.5 | 17.3 ± 2.2 |
| Comparative J | B20 | 3 | 0 | 16.7 | 7.4 ± 2.2 |
| Example 11 | B20 | 3 | 5 | 14.7 | 13.1 ± 4.4 |
| Comparative K | S-BEN | 2.1 | 0 | 62.7 | 3.5 ± 1.0 |
| Example 12 | S-BEN | 2.1 | 5 | 31.9 | 14.2 ± 1.6 |

*Did not polymerize under stated conditions at that catalyst level (88 ppm Ti).
**354 ppm Ti catalyst. All other materials in Table 5 used 88 ppm.

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges includes each and every value within that range.

What is claimed is:

1. A process for preparing thermoplastic polyester composite materials, comprising polymerizing at least one thermoplastic polyester precursor in the presence of:
    a) a filler selected from microparticles, nanoparticles, or mixtures thereof, wherein the filler is selected from the group consisting of silica, silicates, and aluminosilicates, with the proviso that the filler is not pretreated with an organosilane and wherein the total filler present is at about 1.5 to about 10 wt %, based on the weight of the thermoplastic polyester composite thereby produced; and
    b) at least one organosilane having nucleophilic functionality.

2. The process of claim 1 wherein the at least one organosilane is generally described by Formula I

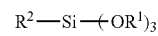

$$R^2—Si—(OR^1)_3 \qquad I$$

wherein each $R^1$ is an independently selected hydrocarbyl group and $R^2$ is an aryl, alkyl, aralkyl, or alkaryl group wherein $R^2$ comprises at least one nucleophilic functional group.

3. The process of claim 2 wherein the at least one nucleophilic functional group is selected from the group consisting of primary amino, secondary amino, tertiary amino; hydroxyl, and mercapto.

4. The process of claim 2 wherein the at least one organosilane is a primary, secondary, or tertiary aminosilane.

5. The process of claim 4 wherein the at least one organosilane is selected from the group consisting of (aminoethylaminomethyl)phenethyltrimethoxysilane, p-aminophenyl trimethoxysilane, 4-aminobutyltriethoxysilane, and N-(hydroxyethyl)-N-methylamino-propyltrimethoxysilane.

6. The process of claim 1 wherein the at least one filler is selected from the group consisting of sepiolite, attapulgite, montmorillonite, and mixtures thereof.

7. The process of claim 6 wherein the at least one filler is unmodified.

8. The process of claim 1 wherein the at least one organosilane is present at about 1 to about 20 wt %, based on the weight of filler.

9. The process of claim 1 wherein the at least one thermoplastic polyester precursor is selected from the group consisting of
   a) at least one diacid or diester and at least one diol;
   b) at least one polymerizable polyester monomer;
   c) at least one linear polyester oligomer; and
   d) at least one macrocyclic polyester oligomer.

10. The process of claim 1 wherein the thermoplastic polyester is selected from the group consisting of: poly(ethylene terephthalate), poly(1,3-propylene terephthalate), poly(1,4-butylene terephthalate), a thermoplastic elastomeric polyester having poly(1,4-butylene terephthalate) and poly(tetramethylene ether)glycol blocks, poly(1,4-cylohexyldimethylene terephthalate), and polylactic acid.

11. The process of claim 1 wherein the thermoplastic polyester is poly(1,4-butylene terephthalate), the at least one organosilane is (aminoethylaminomethyl)phenethyltrimethoxysilane; and the at least one filler comprises unmodified sepiolite nanoparticles.

12. A thermoplastic polyester composite material produced by the process as recited in claim 1.

13. An article of manufacture comprising the thermoplastic polyester composite material as recited in claim 12.

* * * * *